Patented Aug. 17, 1954

2,686,858

UNITED STATES PATENT OFFICE 2,686,858

ELECTROCHEMICAL PAPER AND METHOD OF PREPARING SAME

Earl J. Kohn and David L. Venezky, Washington, D. C.

No Drawing. Application October 24, 1950, Serial No. 191,913

14 Claims. (Cl. 204—2)

(Granted under Title 35, U. S. Code (1952), sec. 266)

This invention relates to the production of improved electrochemical paper suitable for use as the recording medium in electrolytic recording systems.

In electrolytic recording systems, such as facsimile recording, the recorder paper impregnated with a reagent sensitive to the passage of electric current is supported on a metal plate and a stylus is arranged to move over the surface of the paper. The mark or inscription is made on the recorder paper by means of the current flowing therethrough from the stylus which causes the sensitizing reagent to undergo change to a color body.

It has heretofore been proposed to use benzidine as the sensitizing reagent in electrochemical recorder paper by applying it to the paper as a solution in acetone or alcohol-water mixture. J. Ind. Eng. Chem., vol. 39, 1286–88 (1947). Benzidine is practically insoluble in water even at elevated temperatures, necessitating the use of organic solvents in order to obtain solutions of the same in appreciable concentrations. Organic solvents, however, are relatively expensive, to which may be added the cost of safe-handling of the same during the processing. Even if recovery of the solvent is practiced, an additional outlay is involved. A further limitation on the use of benzidine as the sensitizing reagent derives from the fact that this free base is unstable in air and darkens on standing, with the consequence that the paper and, as well, the impregnating solution tend to become discolored after a relatively short period of time.

It is an object of the present invention to provide an electrochemical paper containing an improved sensitizing reagent. It is a further object to provide a method of preparing electrochemical paper which does not require the use of an organic solvent for incorporation of the sensitizing reagent. Other objects will become apparent as the description of the invention proceeds.

The invention, briefly stated, comprises incorporating the benzidine in the paper as a water-insoluble salt by means of a method in which the paper is impregnated, first, with an aqueous solution of a water-soluble salt the anion of which is capable of forming an insoluble salt with benzidine and, then, with an aqueous solution of a water-soluble salt of benzidine, whereby the aforesaid insoluble salt of benzidine is precipitated in the paper and formed in situ therein.

Benzidine in the form of a salt thereof is comparatively stable to air and may be stored indefinitely without development of appreciable discoloration. Thus, following the method of the present invention there may be obtained electrochemical papers of high contrast and sharp definition which retains these qualities for extended periods.

A further advantage of the present method is that the amount of benzidine incorporated in the paper can be controlled by adjusting the concentration of the water-soluble salt in the aqueous solution of the first treating step. This flows from the fact that benzidine forms the water-insoluble salt with the anion of the aforesaid water-soluble salt on a mol to mol basis.

A still further advantage of the method of the invention resides in the fact that with the use of all-aqueous solutions a uniform distribution of the benzidine in the paper can be had without resorting to the use of heated solutions, as is usually the case where organic solvents are employed as the vehicle. Organic solvents, as a rule, do not possess the swelling power of water for paper. Water, because it hydrates the paper, allows greater penetration of the reagent thereinto. The entire impregnation of the paper can be carried out at room temperature by the present method, although, if desired, higher temperatures can be employed such as 40–50° C.

Suitable salts for the initial impregnation of the paper are, for example, water-soluble thiosulfates, tungstates, sulfates and bisulfates, e. g., sodium, potassium and lithium thiosulfate, tungstate, sulfate and bisulfate. Preferred salts of the group are the thiosulfates, more particularly, sodium thiosulfate due to its lower cost and availability. The aforementioned soluble salts on double decomposition with the soluble benzidine salt will deposit in the paper the insoluble benzidine thiosulfate, tungstate, sulfate and bisulfate, respectively. A suitable water-soluble salt of benzidine is the dihydrochloride which is soluble in water to the extent of about 3% at 50° C., and to a lesser extent at the lower temperatures.

The paper used for the production of the electrochemical paper should be smooth, have good wet strength and be free from reagents which would exert an adverse effect on the subsequently developed mark. A suitable paper may be made from bleached rag stock or bleached sulfite pulp, preferably from rag stock, sized with rosin size, and should contain a suitable reagent for improving the wet strength thereof, e. g., melamine-formaldehyde resin.

A suitable electrolyte is incorporated in the paper to lower its impedance to the flow of current from the stylus, for which there may be used salts such as the alkali metal and ammonium chlorides, bromides and iodides, e. g., sodium, potassium and ammonium chloride, bromide and iodide, more particularly the ammonium salts and the bromides. A preferred electrolyte is ammonium bromide since it acts as a promoter in developing the mark. The electrolyte is added to the paper in a third aqueous bath. The amount of the electrolyte required to obtain the required reduction in the impedance of the paper may be determined by a simple testing of the paper impregnated with the particular electrolyte. The amount will vary both with the particular paper and the electrolyte chosen and generally will be in excess of 20% by weight on the water in the bath. In terms of ammonium bromide, for example, the third aqueous bath should contain, on the average, about 250 grams of ammonium bromide per liter of water for best results.

To insure a neutral or nearly neutral condition in the third or final bath, a buffering agent is added thereto. For this purpose any suitable buffering agent may be used, for example, the well-known buffer solution containing disodium phosphate and citric acid, in concentrations calculated to attain a neutral or nearly neutral condition (pH=about 6 to 8) in the aqueous bath.

The third aqueous bath may be made to contain other reagents which do not interfere with formation of the mark on the paper and the function of which is to improve the paper in various respects, such as hygroscopic agents, for example, a hygroscopic polyhydric alcohol, e. g., glycerine, ethylene glycol and diethylene glycol, or to protect it, such as a fungicide.

To assist penetration of the paper by the respective aqueous solutions, a small amount of a surface active agent of the penetrative type (wetting agent) is added to each of the baths, for which, suitably, there is used a non-ionic type surface active agent, for example, polyglycol ethers of alkyl phenols having from 8 to 12 alkyl carbon atoms and in which the polyglycol ether group has a chain of from 8 to 15 ethenoxy groups. This type of non-ionic surface active agent may be made by condensing one mol of the alkyl phenol with from 8 to 15 mols of ethylene oxide, the product usually being a mixture of polyglycol ethers of the alkyl phenol in which the number of ethenoxy groups in the molecule is predominantly between about 8 and 12. Surface active agents of this kind are available on the market.

The impregnation of the paper in all three of the steps can be carried out in a comparatively simple manner. It is necessary only that there be provided a series of three baths with means between and after the baths for removal of excess solution from the treated paper. The operation may be conducted batchwise or in a continuous fashion, in the latter case using suitable paper feeding and discharge means. The paper is fed into the first aqueous bath containing, for example, sodium thiosulfate solution, and after it has become saturated with the soluble salt, is passed through squeeze rolls to remove excess solution, and then superficially dried (sensibly dry). This superficial drying of the paper may be carried out by moving the wet paper through the air, by passing a current of air thereover, or by passing it over heated drums. The superficially dried paper is then padded in the second aqueous bath containing the solution of the soluble benzidine salt, superficially dried as before, and padded in the third aqueous bath containing the electrolyte, for example, ammonium bromide, and the buffering agent. After leaving the third bath and again passing through the squeeze rolls, the paper is dried down in any suitable way to a moisture content of about 30–35% (on the dry weight of the paper).

To preserve the desirable moist condition in the paper it is wound into rolls, wrapped in a suitable moisture-proof covering and stored in sealed metal containers, if desired, in an inert atmosphere, such as carbon dioxide. Instead of retaining the final paper in the moist condition it may be brought to the air dry condition, but in such case it must be remoistened before use in recording.

The method conducted in batchwise fashion differs from the continuous procedure only in that the wetted paper from the first and second baths is preferably dried completely and wound into a roll before submitting it to the wetting operation in the third aqueous bath.

For a more complete understanding of the invention, reference is made to the following specific example in which is described the preparation of an improved electrochemical paper in accordance with a preferred embodiment of the invention.

EXAMPLE

Three solutions constituting aqueous baths 1, 2 and 3 and having the compositions set forth below were prepared by dissolving the ingredients in the specified amount of water. Parts are by weight, except where otherwise noted.

Bath 1

Sodium thiosulfate .5H$_2$O -------- 9
Non-ionic wetting agent -------- 0.001
Water -------- 100

Bath 2

Benzidine dihydrochloride -------- 2.3
Hydrochloric acid -------- 0.3 ml. (37%)
Non-ionic wetting agent -------- 0.0005
Water -------- 100

Bath 3

Ammonium bromide -------- 25
Disodium phosphate .7H$_2$O -------- 5
Citric acid -------- 0.1
Glycerine -------- 5
Non-ionic wetting agent -------- 0.001
Water -------- 100

The non-ionic wetting agent in each instance is a commercially available product of the kind described above made by condensing about 8 to 15 mols of ethylene oxide with one mol of an alkylphenol having about 10 carbon atoms in the alkyl portion thereof. Obviously, instead of this particular wetting agent, other suitable wetting agents can be employed. The pH of bath 1 was about 7, of bath 2 about 1.5, and of bath 3 about 6.2 to 6.5.

A fine, white, smooth-surfaced rag paper, sized with rosin size, and containing melamine-formaldehyde resin for improving its wet strength was passed successively through the baths 1, 2 and 3 at a rate of about 10.4 feet per minute by means of carrier rolls. Between the baths and after the third bath, excess solution was removed from the wetted paper by sending it through squeeze rolls operating at the same speed as the carrier rolls. The paper from the squeeze rolls was superficially dried between the baths. The final paper from bath 3 was dried to dampness (a moisture content of about 30-35% on the dry weight of the paper). All the steps in the impregnation were carried out at room temperature. The final paper impregnated with benzidine thiosulfate contained about 5% of benzidine (as such) on the dry weight of the paper.

The concentration of the insoluble benzidine salt in the paper may be varied depending upon the depth of color desired in the mark. It will also vary somewhat due to the character of the paper used, some papers taking up more of the soluble salt from the first bath than others. In general, marks of satisfactory depth of color may be obtained with concentrations in the paper of from about 2 to 6% of benzidine (calculated as such in contrast to the insoluble salt thereof) on the dry weight of the paper, with preferable concentration being about 4 to 5% thereon. In terms of sodium thiosulfate, for example, concentrations of from about 6 to 9% of this soluble salt in the first bath will generally be found preferable. In respect to the higher concentrations of the soluble salt in the first bath, it is desirable to avoid an excess which will cause incrustation of the paper with the subsequently formed insoluble salt of benzidine.

The order of addition of the salt solutions to the paper is important. If the reverse order of addition had been observed in the above example, the concentration of benzidine in the paper would have been substantially lower, so much so as to be ineffective for the purpose of subsequently developing a satisfactory mark on the paper. The amount of benzidine in the paper in the case of the reverse procedure would depend entirely on the capacity of the paper to absorb or take up the aqueous solution of the benzidine dihydrochloride which, necessarily, is of low concentration, due to the limited solubility of this salt in water. A condition of equilibrium is set up rather quickly in such a system and the concentration of the benzidine dihydrochloride in the paper could never exceed that in the solution. With the prior impregnation of the paper with the aqueous sodium thiosulfate solution, a different system is presented, one in which a condition of equilibrium is not reached until all or substantially all of the thiosulfate ions in the paper have been used up in forming the insoluble salt with the benzidine. Thus, not only is it thereby possible to incorporate greater quantities of benzidine in the paper but, at the same time, the concentration of the benzidine therein can be controlled by regulating the concentration of the thiosulfate or like soluble salt in the first aqueous bath.

Paper made up as in the foregoing example and tested as the recording medium in an electrolytic recording device receiving a pulsating D. C. current, gave a record of high optical contrast and sharp definition in which the mark and tracing were of a deep blue color. In general, the electrochemical paper produced in accordance with the invention will have a low marking threshold, low impedance, and a wide dynamic range, up to about 58 to 60 decibels. The best commercial electrolytic recorder paper tested under the same conditions as the paper of the foregoing example exhibited a considerably lower dynamic range, being about 38 decibels maximum.

Since various changes and modifications can be made in the invention without departing from the spirit and scope thereof, it is not intended that the scope of the invention be limited except as is required by the appended claims.

The invention described herein may be manufactured and used by or for the Government of the United States of America for governmental purposes without the payment of any royalties thereon or therefor.

What is claimed is:

1. Paper suitable for electrolytic recording containing a water-insoluble salt of benzidine formed in situ therein and impregnated with an electrolyte selected from the group consisting of alkali metal and ammonium chloride, bromides and iodides.

2. Paper suitable for electrolytic recording containing a water-insoluble salt of benzidine formed in situ therein and impregnated with an electrolyte which is potassium bromide.

3. Paper suitable for electrolytic recording containing a water-insoluble salt of benzidine formed in situ therein and impregnated with an electrolye which is ammonium bromide.

4. Paper suitable for electrolytic recording containing benzidine thiosulfate formed in situ therein and impregnated with an electrolyte selected from the group consisting of alkali metal and ammonium chlorides, bromides and iodides.

5. Paper suitable for electrolytic recording containing benzidine thiosulfate formed in situ therein and impregnated with an electrolyte which is ammonium bromide.

6. A method of preparing an electrochemically active paper which comprises impregnating the paper with an aqueous solution of a water-soluble salt the anion of which forms a water-insoluble salt with benzidine, bringing the paper to a sensibly dry condition, then treating the paper with an aqueous solution of a water-soluble salt of benzidine, and thereafter incorporating in the paper an electrolyte selected from the group consisting of alkali metal and ammonium chlorides, bromides and iodides.

7. A method of preparing an electrochemically active paper which comprises impregnating the paper with an aqueous solution of a water-soluble salt the anion of which forms a water-insoluble salt with benzidine, bringing the paper to a sensibly dry condition, then treating it with an aqueous solution of a water-soluble salt of benzidine, and thereafter with an aqueous solution of an electrolyte selected from the group consisting of alkali metal and ammonium chlorides, bromides and iodides.

8. The method as defined in claim 7, wherein a buffering agent is present in the aqueous solution of the electrolyte and in amount sufficient to attain a pH of from about 6 to 8 in the aqueous solution.

9. A method of preparing an electrochemically active paper which comprises impregnating the paper with an aqueous solution of an alkali metal thiosulfate, bringing the paper to a sensibly dry condition, then treating it with an aqueous solution of benzidine dihydrochloride, and thereafter with an aqueous solution of ammonium bromide.

10. The method as defined in claim 9, wherein the alkali metal thiosulfate is sodium thiosulfate.

11. The method as defined in claim 9, wherein a buffering agent is present in the aqueous solution of the ammonium bromide and in amount sufficient to attain a pH of from about 6 to 8 in the aqueous solution, said buffering agent comprising an aqueous solution of disodium phosphate and citric acid.

12. The method as defined in claim 11, wherein the alkali metal thiosulfate is sodium thiosulfate.

13. Paper suitable for electrolytic recording containing benzidine sulfate formed in situ therein and impregnated with an electrolyte which is potassium bromide.

14. Paper suitable for electrolytic recording containing benzidine sulfate formed in situ therein and impregnated with an electrolyte which is an alkali metal bromide.

References Cited in the file of this patent

UNITED STATES PATENTS

| Number | Name | Date |
|---|---|---|
| 2,461,892 | Greig | Feb. 15, 1949 |

OTHER REFERENCES

Currah et al.: Industrial and Engineering Chemistry, vol. 39 (1947), pages 1286–88.

Organic Chemistry, by Frank C. Whitmore, 4th printing, D. Van Nostrand Co., N. Y., 1941, page 832. (Copy in library.)

Karrer, Paul: Organic Chemistry, 2nd English edition (1946), pp. 437, 441. Elsevier Pub. Co., N. Y. Copy in library.